United States Patent [19]
Maeda

[11] Patent Number: 5,742,072
[45] Date of Patent: Apr. 21, 1998

[54] LIGHT CONTROL SUBSTANCE AND LIGHT CONTROL METHOD USING THE SAME

[75] Inventor: Yoshinobu Maeda, Yokkaichi, Japan

[73] Assignee: Research Development Corporation of Japan, Japan

[21] Appl. No.: 663,530

[22] Filed: Jun. 13, 1996

[30] Foreign Application Priority Data

Jul. 10, 1995 [JP] Japan .................................. 7-173797

[51] Int. Cl.⁶ .................... H01L 29/06; H01L 31/0328; H01L 31/0336; H01L 33/00

[52] U.S. Cl. .................. 257/17; 257/21; 257/22; 257/82; 257/85; 257/101; 257/102; 257/184; 372/44; 372/45; 359/248

[58] Field of Search .................... 257/21, 17, 22, 257/84, 85, 101, 102, 81, 82, 184; 372/44, 45; 359/248

[56] References Cited

U.S. PATENT DOCUMENTS

| | | | |
|---|---|---|---|
| 3,893,044 | 7/1975 | Dumke et al. | 372/47 |
| 4,881,979 | 11/1989 | Lewis | 257/189 X |
| 5,170,407 | 12/1992 | Schubert et al. | 372/45 X |
| 5,423,798 | 6/1995 | Crow | 606/4 |
| 5,502,737 | 3/1996 | Chartier et al. | 372/11 |
| 5,528,612 | 6/1996 | Scheps et al. | 372/23 |
| 5,557,624 | 9/1996 | Stultz et al. | 372/39 X |

OTHER PUBLICATIONS

Jain et al., "Degenerate Four–Wave Mixing in Semiconductor–Doped Glasses," *J. Opt. Soc. Am.*, vol. 73, No. 5, May 1983, pp. 647–663, May 1983.

Kubodera, "Future Prospect of Nonlinear Optical Devices," *Oyo Buturi*, vol. 58, No. 11, Feb. 1990, pp. 155–163, Feb. 1990.

Kawaguchi, "Optical Bistability and Switching in Semiconductor Lasers," *Oyo Buturi*, vol. 58, No. 11, Nov. 1989, pp. 647–653, Nov. 1989.

Journal of Applied Physics, vol. 72, No. 8, 15 Oct. 92 pp. 3835–3837, Maeda, "Negative Nonlinear Absorption Effects in Erbium–Yttrium Aluminum Garnets".

*Primary Examiner*—William Mintel
*Attorney, Agent, or Firm*—Lorusso & Loud

[57] ABSTRACT

A light control substance having a negative input-output characteristic is used to invert optical signals. The light control substance is an absorbing substance and has a multi-level energy structure such that ground state absorption occurs between a ground level and a level higher than the ground level and excited state absorption occurs between an excited level and a level higher than the excited level. At a specific wavelength, a variation $\Delta I_{out}$ in the intensity of output light and a variation $\Delta I_{in}$ in the intensity of input light satisfy the following equations:

$$\Delta I_{out} = [1 - \alpha_1(1 + \alpha_2 \gamma)] \Delta I_{in} \quad (1)$$

$$\alpha_1(1 + \alpha_2 \gamma) > 1 \quad (2)$$

where $\alpha_1$ is an absorbance of the ground state absorption, $\alpha_2$ is an absorbance of the excited state absorption, and $\gamma$ is a ratio of electrons relaxing from the level higher than the ground level to the exited level. As a result, the value of $\Delta I_{out}/\Delta I_{in}$ becomes negative.

12 Claims, 8 Drawing Sheets

F I G. 3
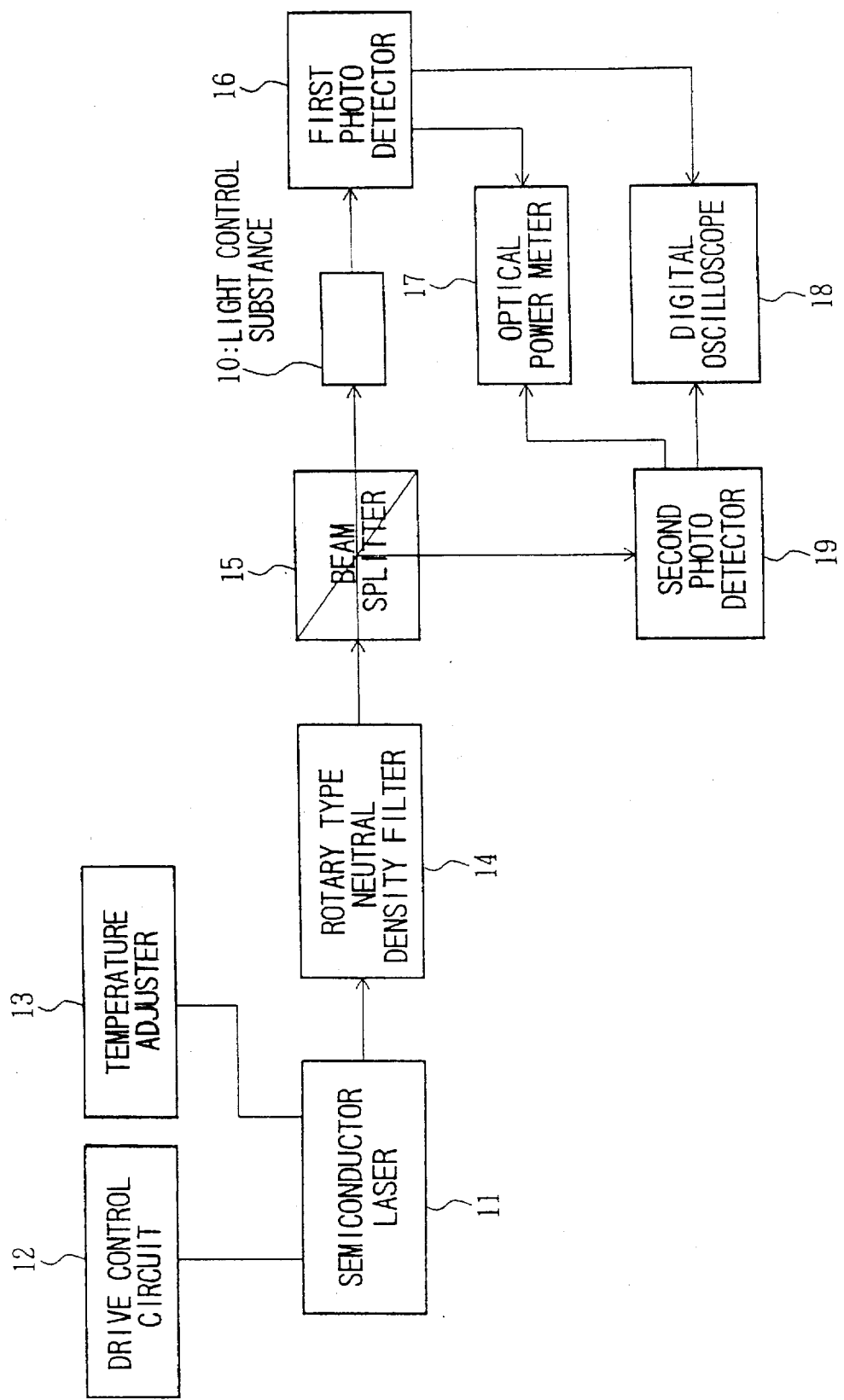

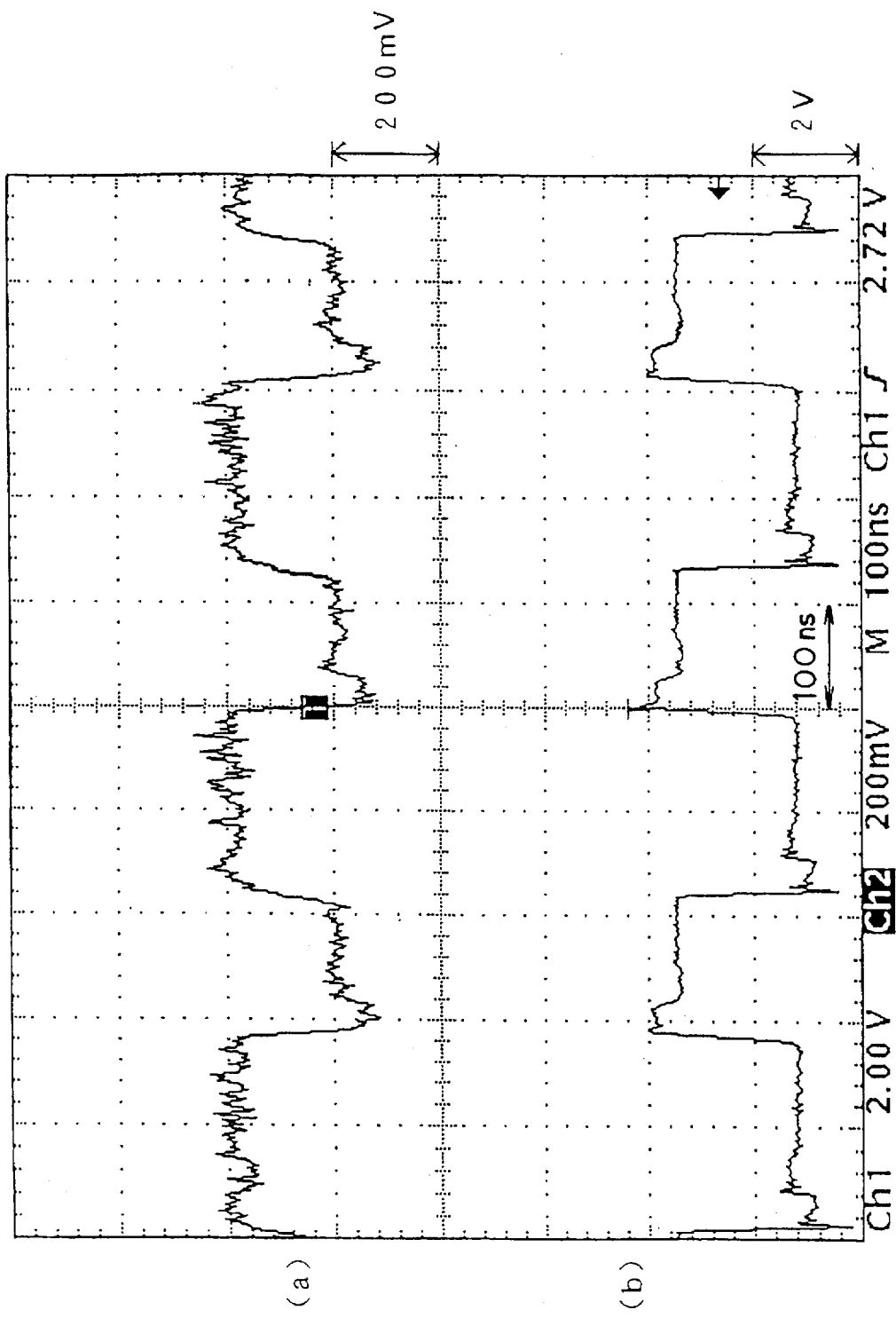

F I G. 6
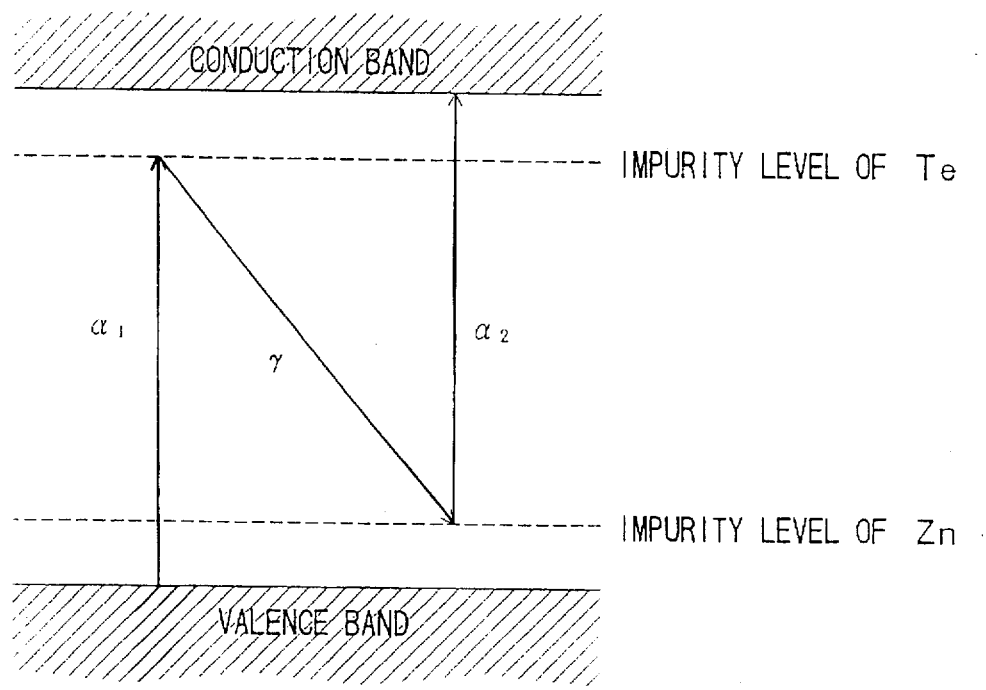
F I G. 7
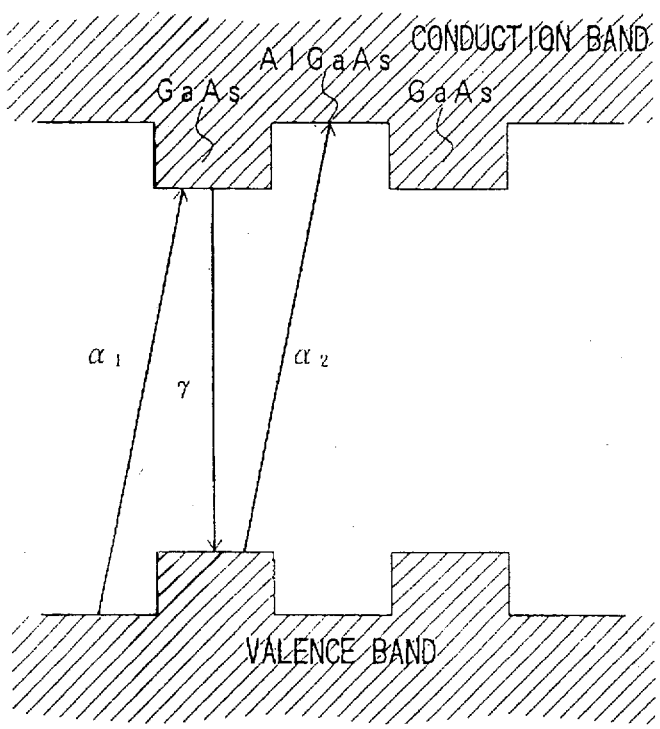

LIGHT CONTROL SUBSTANCE AND LIGHT CONTROL METHOD USING THE SAME

BACKGROUND OF THE INVENTION

1. Field of the Invention

The present invention relates to a technique for controlling light using light, and more particularly to a light control substance useful for the inversion of optical signals, which is essential in the field of optoelectronics for optical logic operations. The present invention also relates to a light control method using such a light control substance.

2. Description of the Related Art

Recent progress in optoelectronics has been remarkable, and it has been a basic technology in the fields of optical communication, optical computation, and the like.

Under these circumstance, control technique for light has become essential for optoelectronics. Among various control techniques, special attention has been given to methods for controlling light so as to perform logical operations of a computer using optical signals. Various studies have been made to develop such light control methods.

For example, in the field of optoelectronics such as optical communication and optical information processing, various studies have been carried out so as to control light by means of control light.

Such light control methods allow a switching operation faster than that provided by an electrical switching circuit, and also allow multiple parallel processing by utilizing the focusing performance of light. Therefore, such light control methods are expected to be useful in optical integrated circuits and the like.

In relation to the above-described techniques, studies have been made of an optical device which utilizes a nonlinear optical effect for light control. Conventionally, this nonlinear optical effect has been considered to be of practical importance because of its wavelength conversion effect such as generation of second order harmonics. However, in recent years, attention has been given to and studies have been made of an effect in which the refractive index and absorption coefficient vary depending on light intensity (OYO BUTURI 59, pp. 155–163, February, 1990).

However, since variation of refractive index and absorption coefficient with light intensity occurs with the third order polarization, a nonlinear optical material having a large high-order polarization effect is needed ("Degenerate fourwave mixing in semiconductor-doped glasses", J. Opt. Soc. Am., 73, pp. 647–653, May 1983).

In saturable absorption type bistable semiconductor laser, input light is used for switching from an off state to an on state. However, since there exists no negative light pulse, a circuit for switching from the on state to the off state (a NOT circuit) has not been implemented (OYO BUTURI 58, pp. 1574–1583, November, 1989).

SUMMARY OF THE INVENTION

An object of the present invention is to solve the above-mentioned problems and to provide a light control substance and a light control method, which can invert optical signals in an optical inverting circuit, thereby making it possible to perform all-optical type logic operations.

To achieve the above object, the present invention provides a light control substance serving as an absorbing material and having a multi-level energy structure such that ground state absorption occurs between a ground level and a level higher than the ground level and excited state absorption occurs between an excited level and a level higher than the excited level, whereby a variation $\Delta$Iout in the intensity of output light becomes negative with respect to a variation $\Delta$Iin in the intensity of input light, i.e., the value of $\Delta$Iout/$\Delta$Iin becomes negative, at an optical wavelength at which the ground state absorption and the excited state absorption occur.

Preferably, the following equations are satisfied:

$$\Delta \text{Iout} = [1 - \alpha_1(1 + \alpha_2 \gamma)] \Delta \text{Iin} \quad (1)$$

$$\alpha_1(1 + \alpha_2 \gamma) > 1 \quad (2)$$

where $\alpha_1$ is an absorbance of the ground state absorption, $\alpha_2$ is an absorbance of the excited state absorption, and $\gamma$ is a ratio of electrons relaxing from the level higher than the ground level to the exited level.

Preferably, at least one element selected from the group consisting of transition metal elements and rare earth elements is included in a substance selected from the group consisting of insulating materials, semiconductors, glasses, and ceramics.

In this case, erbium is preferably included as a rare earth element.

In this case, the ground state absorption preferably occurs between the $^4I_{9/2}$ level and $^4I_{15/2}$ level and the excited state absorption preferably occurs between the $^2H_{11/2}$ level and $^4I_{13/2}$ level in the energy level structure of erbium.

Preferably, the band structure, impurity level, or super lattice structure of a semiconductor is utilized.

Preferably, a light reflective material is attached to an end surface of the light control substance so as to reduce the size of the light control substance.

The present invention also provides a light control method. This method comprises the steps of irradiating at least two light beams onto the light control substance of the present invention, and varying the intensity of one of the light beams so as to control the intensity of the other light beam.

The present invention further provides a light control method using the light control substance of the present invention. In the case where the difference between the ground level and the level higher than the ground level is substantially equal to the difference between the excited level and the level higher than the excited level, a variation $\Delta$Iout in the intensity of output light becomes negative with respect to a variation $\Delta$Iin in the intensity of input light, i.e., the value $\Delta$Iout/$\Delta$Iin becomes negative, only at a single wavelength.

As described above, since the light control substance according to the present invention has both ground state absorption and excited state absorption, a negative input-output characteristic is obtained. That is, when the intensity of input light increases, the intensity of output light decreases, and when the intensity of input light decreases, the intensity of output light increases. Using this effect, it becomes possible to vary the intensity of output light inversely with respect to variations in the intensity of input light.

Also, in the light control method according to the present invention using two light beams, the intensity of the first light beam can be modulated with respect to a variation in the intensity of the second light beam.

BRIEF DESCRIPTION OF THE DRAWINGS

FIG. 3 is a view showing the structure of an apparatus for measuring the optical input-output characteristic used in the first embodiment of the present invention;

FIG. 5 is a diagram showing the result of an experiment in which variations in the intensity of a light beam before and after passing through the light control substance according to the first embodiment of the present invention were measured using an oscilloscope;

FIG. 6 is a diagram showing the energy band structure of a light control substance according to a second embodiment of the present invention in which Te elements are introduced as donors and Zn elements are introduced as acceptors into a GaAs compound semiconductor;

FIG. 7 is a diagram showing the energy band structure of another light control substance according to the second embodiment of the present invention which utilizes a super lattice structure consisting of GaAs and $Al_xGa_{1-x}As$;

DESCRIPTION OF THE INVENTION AND PREFERRED EMBODIMENTS

First, the present invention will be described.

An ordinary absorbing substance exhibiting only a simple ground state absorption has a positive input-output characteristic.

The present invention employs a light control substance which exhibits excited state absorption and has a negative input-output characteristic due to the effect of the excited state absorption.

This effect will now be described with reference to an energy level diagram shown in FIG. 1.

Figure 1:
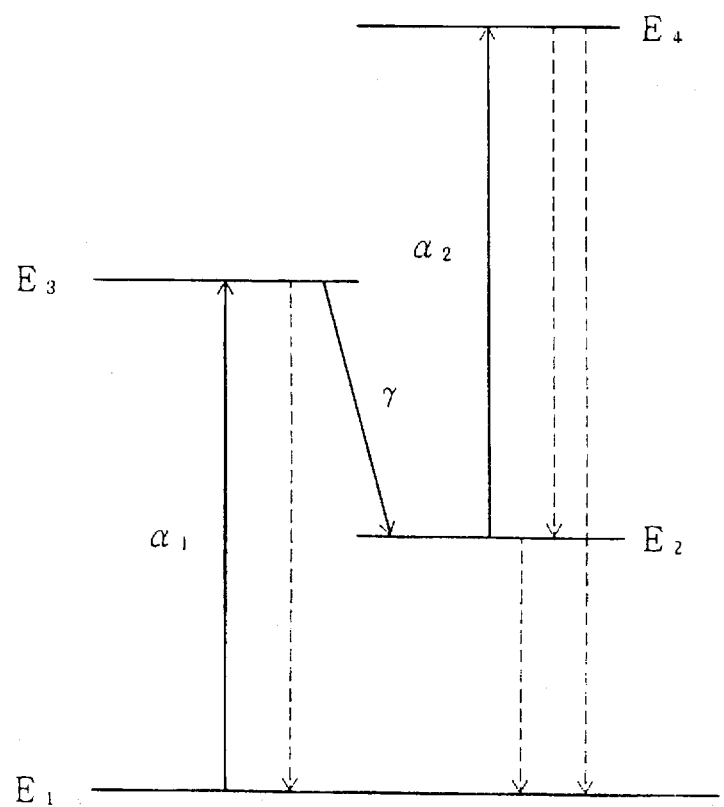
FIG. 1 is an energy-level diagram of a light control substance according to the present invention.

In FIG. 1, the difference ($E_3$–$E_1$) between energy levels $E_3$ and $E_1$ is substantially equal to the difference ($E_4$–$E_2$) between energy levels $E_4$ and $E_2$. When light having an energy corresponding to the energy difference $E_3$–$E_1$ enters the light control substance, electrons at level $E_1$ are excited to level $E_3$ with an absorption $\alpha_1$. The excited electrons relax to level $E_2$ at a relaxation rate $\gamma$. The electrons which have relaxed to level $E_2$ absorb incident light again and are excited to level $E_4$ with an absorption $\alpha_2$.

Accordingly, when a variation in the density of input light is $\Delta$Iin, a variation in the density of output light can be expressed by the following equation:

$$\Delta Iout = [1 - \alpha_1(1 + \alpha_2\gamma)]\Delta Iin \quad (1)$$

where $\alpha_1$ is an absorbance of the ground state absorption, $\alpha_2$ is an absorbance of the excited state absorption, and $\gamma$ is a ratio of electrons relaxing from the level $E_3$ higher than the ground level to the exited level $E_2$.

In the case of simple absorption involving no excited state absorption (i.e., $\alpha_2=0$), the value of $\Delta$Iout/$\Delta$Iin becomes positive. This means that the intensity of the output light increases and decreases substantially in proportion to increases and decreases in the intensity of the input light.

However, as is understood from equation (1), depending on the value of $\alpha_2\gamma$, the relationship $\alpha_1(1+\alpha_2\gamma)>1$ is satisfied even when $\alpha_1<1$. That is, the value of $\Delta$Iout/$\Delta$Iin becomes negative, so that a negative input-output characteristic can be obtained, in which the intensity of the output light increases and decreases inversely with respect to increases and decreases in the intensity of the input light.

Accordingly, optical signals can be inverted using a light control substance having the above-described characteristic.

Next, embodiments of the present invention will now be described with reference to the accompanying drawings.

First Embodiment

Figure 2:
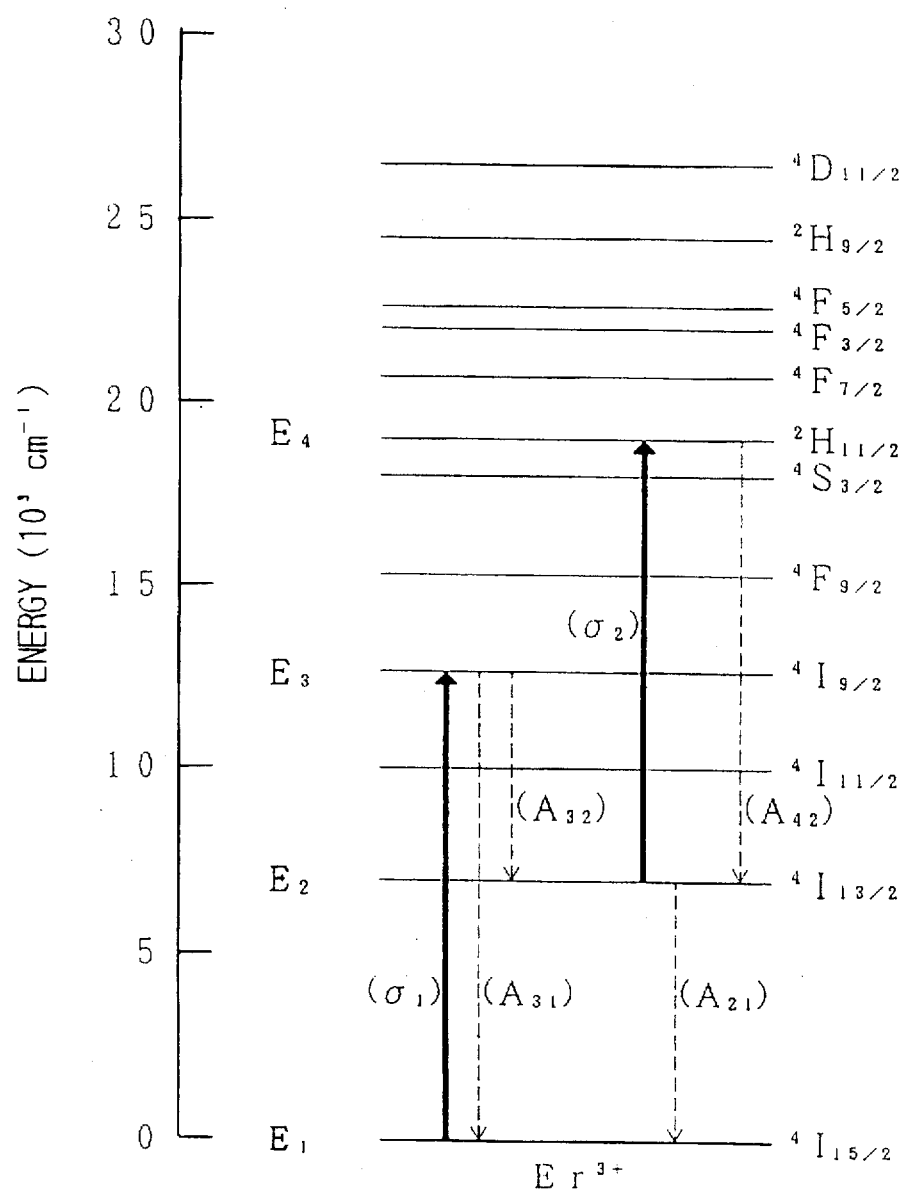
FIG. 2 is an $Er^{3+}$ energy-level diagram of a light control substance according to a first embodiment of the present invention.

FIG. 2 is an $Er^{3+}$ energy-level diagram of a light control substance according to a first embodiment of the present invention. In the present embodiment, erbium, one of rare earth elements, is used. In FIG. 2, $\sigma_1$ is an absorption cross section of the ground state absorption, and $\sigma_2$ is an absorption cross section of the excited state absorption.

In the present embodiment, yttrium aluminum garnet (YAG) crystal including 50 at. % of erbium and measuring ø10 mm×4 mm is used as a sample.

First, we consider a double absorption model and an enhanced absorption in order to explain the above observations. When photons with energy ($E_3$–$E_1$) are incident on this system, the electrons in the ground state $E_1$ ($^4I_{15/2}$) are excited to the level $E_3$ ($^4I_{9/2}$) with an absorption cross section of $\sigma_1$. The excited electrons relax to the ground state and the metastable $E_2$ ($^4I_{13/2}$) level at relaxation rates $A_{31}$ and $A_{32}$, respectively. In the double-absorption model, the electrons which have relaxed to the $^4I_{13/2}$ level absorb incident photons again and are excited to the $E_4$ ($^2H_{11/2}$) level with a $\sigma_2$ absorption cross section. The excited electrons in the $^2H_{11/2}$ level relax to the $^4S_{3/2}$ at level nonradiatively and the luminescences $^4S_{3/2} \rightarrow ^4I_{13/2}$ at 840 nm and $^4S_{3/2} \rightarrow ^4I_{13/2}$ at 550 nm are radiated in Er: YAG crystal. Furthermore, the electrons which have transited to the $^4I_{13/2}$ level absorb the incident photons again and the enhanced absorption occurs due to excited state absorption from $^4I_{13/2}$ to $^2H_{11/3}$.

The absorption cross sections $\sigma_1$ and $\sigma_2$ of the Er:YAG crystal has been measured, and their values are 2 and 6.3 $cm^{-1}$, respectively (Y. Shimony et. al., Journal of Applied Physics, Vol. 68, p. 2966, 1990).

The absorbance $\alpha_1$ of the ground state absorption and the absorbance $\alpha_2$ of the excited state absorption can be obtained by multiplying the absorption cross sections by the length of the sample. When the sample has a thickness of 0.4 cm, the absorbance $\alpha_1$ of the ground state absorption and the absorbance $\alpha_2$ of the excited state absorption are estimated as being about 0.8 and about 2.5, respectively.

Accordingly, when $\gamma>0.1$ n equation (1), equation (2) is satisfied, so that the sample exhibits a negative input-output characteristic.

FIG. 3 is a view showing the structure of an apparatus for measuring the optical input-output characteristic used in the first embodiment of the present invention.

As shown in FIG. 3, a semiconductor laser 11 serving as a light source is driven by a drive control circuit 12 and a temperature adjuster 13 so as to output a laser beam having a constant wavelength (about 788 nm) through continuous oscillation or pulse generating operation.

The laser beam is passed through a rotary type neutral density filer 14, and is split into two laser beams by using a beam splitter 15. One of the laser beams is inputted to a light control substance 10 of Er:YAG. The light passing through the light control substance 10 is received by a first photo detector 16 for observation using an optical power meter 17 and a digital oscilloscope 18.

The other of the laser beams split by the beam splitter 15 is received by a second photo detector 19 for observation using an optical power meter 17 and a digital oscilloscope 18.

Figure 4A:
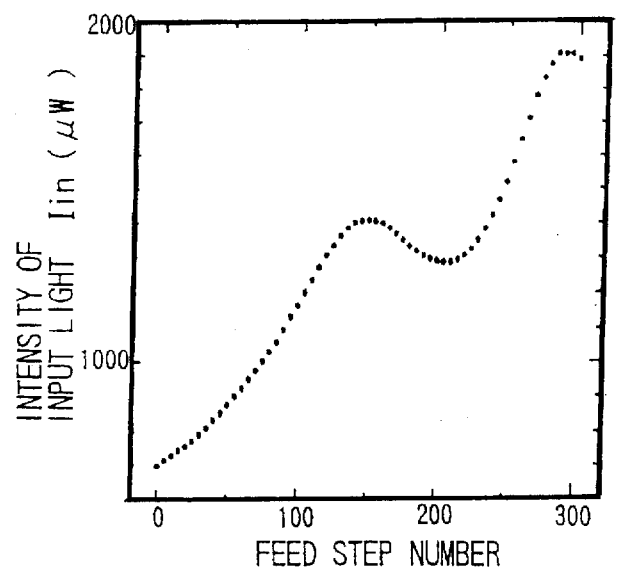
FIGS. 4(a)–4(c) are diagrams showing the results of an experiment in which a laser beam was irradiated onto the light control substance according to the first embodiment of the present invention and the intensity of the laser beam was varied while measurement was performed using an optical power meter.
Figure 4B:
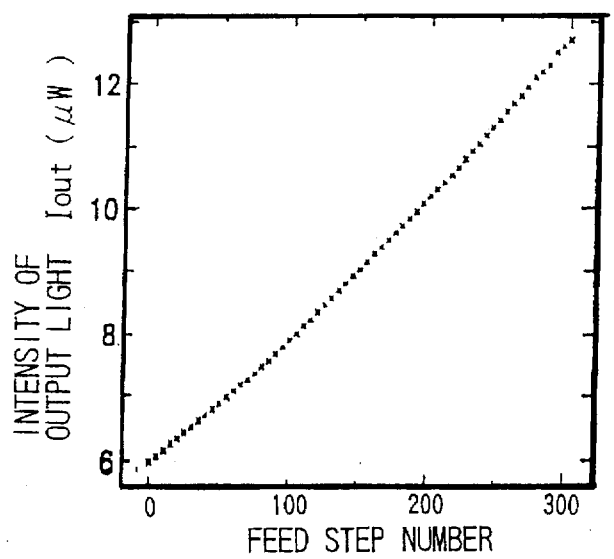
Figure 4C:
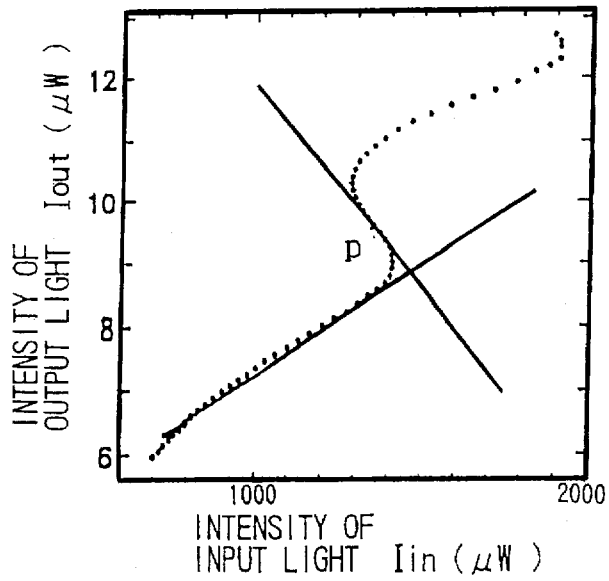

FIGS. 4(a)–4(c) show the results of an experiment in which a laser beam was irradiated onto the light control substance according to the first embodiment of the present invention while measurement was performed using an optical power meter. In detail, during the measurement, the rotary type neutral density filter 14 was rotated automatically so as to change the density of the filter, thereby changing the intensity of the laser beam.

FIG. 4(a) shows a variation in the intensity of input light detected by the second photo detector 19. The horizontal axis represents the number of feed steps of the rotary type neutral density filter 14, while the vertical axis represents a variation in the intensity of input light Iin (μW) with a variation in the number of feed steps.

FIG. 4(b) shows a variation in the intensity of output light after passing through the light control material 10 and detected by the first photo detector 16. The horizontal axis represents the number of feed steps of the rotary type neutral density filter 14, while the vertical axis represents a variation in the intensity of output light Iout (μW) with a variation in the number of feed steps.

As a result, as shown in FIG. 4(b), the intensity of output light after passing through the light control substance increases monotonously while canceling the variation in the intensity of input light.

It can be seen from FIG. 4(c) that the inclination ΔIout/ΔIin becomes negative at a portion indicated by symbol p.

FIG. 5 is a diagram showing the result of an experiment in which variations in the intensity of a light beam before and after passing through the light control substance according to the first embodiment of the present invention were measured using an oscilloscope. In this experiment, a semiconductor laser element was operated in a high speed pulse mode so as to generate the light beam.

In output waveform (a) in FIG. 5 shows the waveform of input light detected by the first photo detector 16, and input waveform (b) in FIG. 5 shows the waveform of output light after passing through the light control substance and detected by the second photo detector 19.

Comparison between the waveforms (a) and (b) reveals that the intensity of the output signal light varies inversely with respect to the variation in the intensity of the input signal light.

This occurred due to the same cause as that described in relation to the above-mentioned experiment. That is, the light control substance operates to decrease the intensity of output light when the intensity of input light increases, and to increase the intensity of the output light when the intensity of the input light decreases.

Second Embodiment

The light control substance of the present invention can be realized by using the band structure, impurity level, or the super lattice structure of a semiconductor.

FIG. 6 shows the energy band structure of a light control substance according to a second embodiment of the present invention in which Te elements are introduced as donors and Zn elements are introduced as acceptors into a GaAs compound semiconductor.

In this structure, Te and Zn serving as impurities are ionized at a normal temperature. Therefore, a desired characteristic is obtained slightly at low temperatures.

FIG. 7 shows the energy band structure of another light control substance according to the second embodiment of the present invention which utilizes a super lattice structure consisting of GaAs and $Al_xGa_{1-x}As$. This structure also provides a desired characteristic.

Third Embodiment

Figure 8:
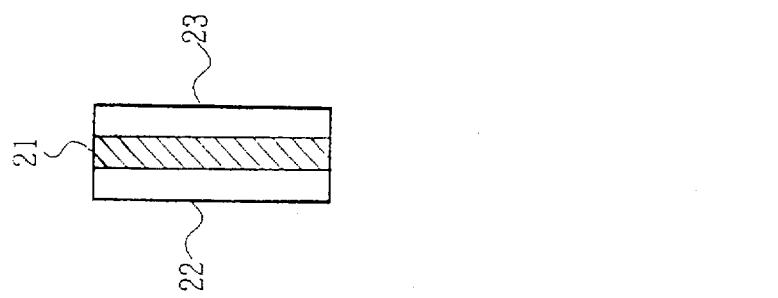
FIG. 8 is a sectional view of a light control substance according to a third embodiment of the present invention in which a light reflective material is attached to each end surface of a sample.

In the first embodiment, a sample having a thickness of 4 mm was used so as to obtain the above-described effect. In the present embodiment, a reflective material is attached to opposite end surfaces of the sample so as to reduce its thickness further. FIG. 8 is a sectional view showing the structure according to the present embodiment. The sample of the present embodiment having a thickness of 0.5 mm provided the same effect as that provided by the sample of the first embodiment.

As shown in FIG. 8, multi-layer films 22 and 23 made of a reflective material (transmissivity: about 20%) are laminated onto a sample 21 made of yttrium aluminum garnet (YAG) crystal including 50 at. % of erbium, such that the total thickness becomes 0.5 mm.

Fourth Embodiment

In the above-described embodiments, there were shown the cases in which a single laser beam is used. However, various kinds of light control can be performed using two or more laser beams at light wavelengths at which both ground state absorption and excited state absorption occur.

Figure 9:
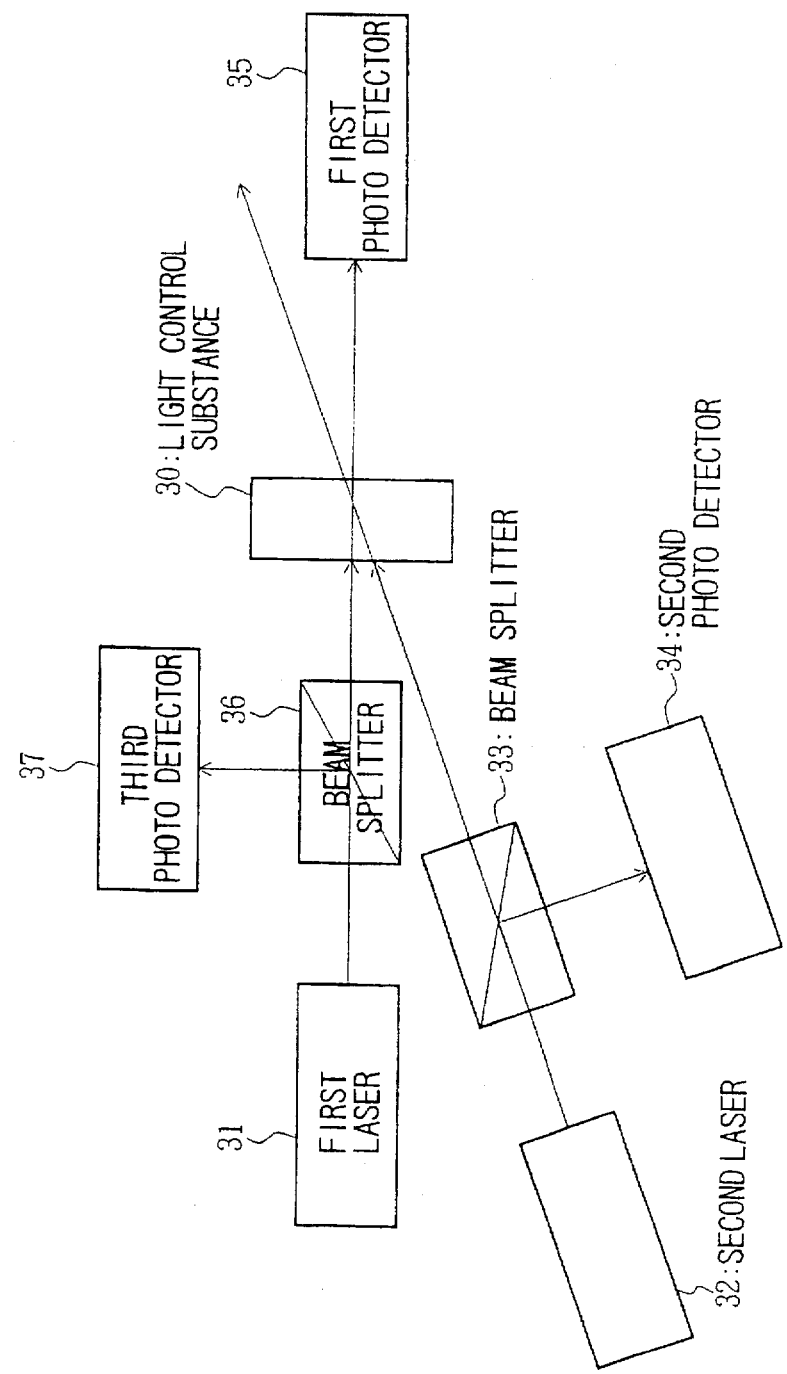
FIG. 9 is a diagram showing the structure of a light control system according to a fourth embodiment of the present invention in which two laser beams are utilized.

FIG. 9 is a diagram showing the structure of a light control system according to a fourth embodiment of the present invention in which two laser beams are utilized.

In FIG. 9, numeral 30 denotes a light control substance according to the present invention, onto which first and second laser beams from first and second lasers 31 and 32 are irradiated simultaneously. The output waveform of the light control substance 30 is detected by a first photo detector 35.

The intensity of light, which is irradiated from the second laser 32 and enters the light control substance 30, is detected by measuring the intensity of light split by a beam splitter 33.

Further, the intensity of the laser beam from the first laser 31 is detected by a third photo detector 37 via a beam splitter 36.

Figures 10A, 10B, 10C:
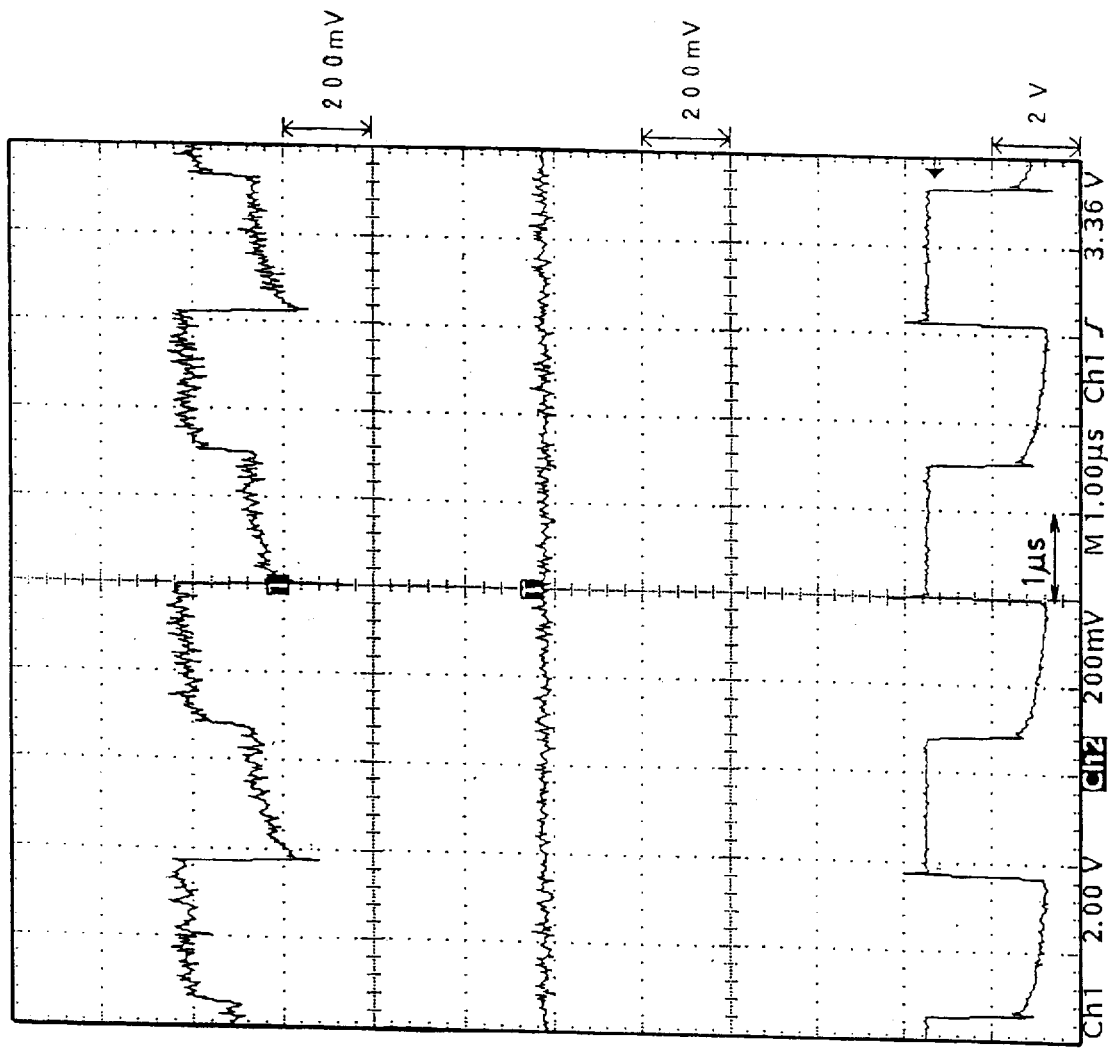
FIGS. 10(a)–10(c) are waveform diagrams showing waveforms at various portions of the light control system shown in FIG. 9.

FIGS. 10(a)–10(c) are waveform diagrams showing waveforms detected by the photo detectors during an experiment. In detail, the first laser 31 was operated for continuous oscillation so as to supply a laser beam having a constant intensity to the light control substance 30. Also, the second laser 32 was operated to supply a second laser beam to change the intensity of the second laser beam and to be superposed on the first laser beam. FIG. 10(a) shows a waveform representing a variation in the intensity of the first laser beam after passing through the light control substance 30. FIG. 10(b) shows a waveform representing a variation in the intensity of the first laser beam before entering the light control substance 30. FIG. 10(c) shows a waveform representing a variation in the intensity of the second laser beam before entering the light control substance 30.

When the first laser is operated for continuous operation so as to supply to the light control substance 30 a laser beam having a constant intensity, as shown in FIG. 10(b), and the intensity of the second laser beam from the second laser 32, which is superposed on the first laser beam, is varied, as shown in FIG. 10(c), the intensity of the first laser beam after passing through the light control substance 30 varies as shown in FIG. 10(a).

As is apparent from the above description, the light irradiated from the first laser 31 and passing through the light control substance 30 is modulated with respect to the variation in the intensity of the second laser beam from the second laser 32.

Accordingly, the first laser beam can be controlled using the second laser beam.

The present invention is not limited to the above-described embodiment. Numerous modifications and variations of the present invention are possible in light of the spirit of the present invention, and they are not excluded from the scope of the present invention.

What is claimed is:

1. A light control device for controlling light transmission from a first light source comprising a light control substance in a path of light from the first light source, said light control substance serving as an absorbing substance and having a multi-level energy structure such that ground state absorption occurs between a ground level and a level higher than the ground level and excited state absorption occurs between an excited level and a level higher than the excited level, whereby a variation $\Delta$Iout in the intensity of output light becomes negative with respect to a variation $\Delta$Iin in the intensity of input light and the value of $\Delta$Iout/$\Delta$Iin becomes negative, at an optical wavelength at which the ground state absorption and the excited state absorption occur; and a second light source for impinging light on the light control substance to control the transmission of light from the first light source.

2. A light control device according to claim 1, wherein the following equations are satisfied by the light control substance:

$$\Delta \text{Iout} = [1 - \Delta_1 (1 + \alpha_2 \gamma)] \Delta \text{Iin} \quad (1)$$

$$\alpha_1 (1 + \alpha_2 \gamma) > 1 \quad (2)$$

where $\alpha_1$ is an absorbance of the ground state absorption, $\alpha_2$ is an absorbance of the excited state absorption, and $\gamma$ is a ratio of electrons relaxing from the level higher than the ground level to the excited level.

3. A light control device according to claim 2, wherein said light control substance comprises at least one element selected from the group consisting of transition metal elements and rare earth elements, and a substance selected from the group consisting of insulating materials, semiconductors, glasses, and ceramics.

4. A light control device according to claim 3, wherein erbium is included as a rare earth element.

5. A light control device according to claim 4, wherein the ground state absorption occurs between the $_4I_{9/2}$ level and $^4I_{15/2}$ level and the excited state absorption occurs between the $^2H_{11/2}$ level and $^4I_{13/2}$ level in the energy level structure of erbium.

6. A light control device according to claim 1, wherein the light control substance utilizes a band structure of a semiconductor.

7. A light control device according to claim 1, wherein a light reflective material is attached to an end surface of said light control substance so as to reduce the size of the light control substance relative to a light control substance without a light reflective material.

8. A light control method comprising steps of: irradiating at least two light beams onto a light control substance serving as an absorbing substance and having a multi-level energy structure such that ground state absorption occurs between a ground level and a level higher than the ground level and excited state absorption occurs between an excited level and a level higher than the excited level, whereby a variation $\Delta$Iout in the intensity of output light becomes negative with respect to a variation $\Delta$Iin in the intensity of input light and the value of $\Delta$Iout/$\Delta$Iin becomes negative, at an optical wavelength at which the ground state absorption and the excited state absorption occur; and varying the intensity of one of the light beams so as to control the intensity of the other light beam.

9. A light control device according to claim 1, wherein, in the light control substance, the difference between the ground level and the level higher than the ground level is substantially equal to the difference between the excited level and the level higher than the excited level, a variation $\Delta$Iout in the intensity of output light becomes negative with respect to a variation $\Delta$Iin in the intensity of input light, and the value of Iout/$\Delta$Iin becomes negative, only at a single wavelength.

10. A light control device according to claim 1 wherein said light control substance includes a semiconductor with an impurity which is utilized for the ground state absorption.

11. A light control device according to claim 1 wherein said light control substance includes a semiconductor with an impurity which is utilized for the excited state absorption.

12. A light control device according to claim 1 wherein said light control substance includes a super lattice structure which is utilized for the ground state absorption and the excited state absorption.

* * * * *

UNITED STATES PATENT AND TRADEMARK OFFICE
CERTIFICATE OF CORRECTION

PATENT NO.   : 5,742,072
DATED        : April 21, 1998
INVENTOR(S)  : MAEDA

It is certified that error appears in the above-indentified patent and that said Letters Patent is hereby corrected as shown below:

Col. 4, line 34, "$(^4L_{9/3})$" should read --$(^4L_{9/2})$--; and
line 60, "n" should read --in--.

Col. 7, line 45, "$\Delta Iout=[1-\Delta_1(1+\alpha_2\gamma)]\Delta Iin$" should read --$\Delta Iout=[1-\alpha_1(1+\alpha_2\gamma)]\Delta Iin$--.

Col. 8, line 7, "$_4I_{9/2}$" should read --$^4I_{9/2}$--.

Signed and Sealed this

Fifteenth Day of December, 1998

Attest:

BRUCE LEHMAN

Attesting Officer

Commissioner of Patents and Trademarks